United States Patent [19]
Estep

[11] Patent Number: 5,769,246
[45] Date of Patent: Jun. 23, 1998

[54] HOLDER FOR MIXER ATTACHMENTS

[76] Inventor: Darrell R. Estep, 4805 Camas, Boise, Id. 83705-5834

[21] Appl. No.: 716,806

[22] Filed: Sep. 16, 1996

[51] Int. Cl.$^6$ ..................................................... A47F 7/00
[52] U.S. Cl. .................. 211/70.6; 211/86.01; 248/205.3
[58] Field of Search .......................... 211/70.6, 86, 59.1; 248/205.1, 442.2, 476, 499, 551, 553, 108, 205.3

[56] References Cited

U.S. PATENT DOCUMENTS

| | | | |
|---|---|---|---|
| 4,739,885 | 4/1988 | Noland et al. | 206/553 |
| 4,960,257 | 10/1990 | Waters | 248/442.2 |
| 5,467,874 | 11/1995 | Whitaker | 206/378 |
| 5,544,031 | 8/1996 | Blanton | 362/396 |

*Primary Examiner*—Robert W. Gibson, Jr.

[57] ABSTRACT

A holder for mixer attachments including a base member. The base member has a front wall, a back wall and pair of short peripheral walls and a pair of long peripheral wall between the front and back wall. A plurality of guide dowels are interconnected to the front wall of the base member. Each guide dowel has a retaining pin positioned within a side of the dowel. At least one electric mixer attachment is positioned over one of the guide dowels. The mixer attachment has a neck portion with a key hole that is capable of engaging the retaining pin of the dowel. Lastly, an L-shaped bracket is provided. The bracket has a first panel that is fixedly attached to one of the long side walls of the base member. The bracket has a second panel that is capable of coupling with a receiving structure for securing the base member juxtapose the receiving structure.

1 Claim, 3 Drawing Sheets

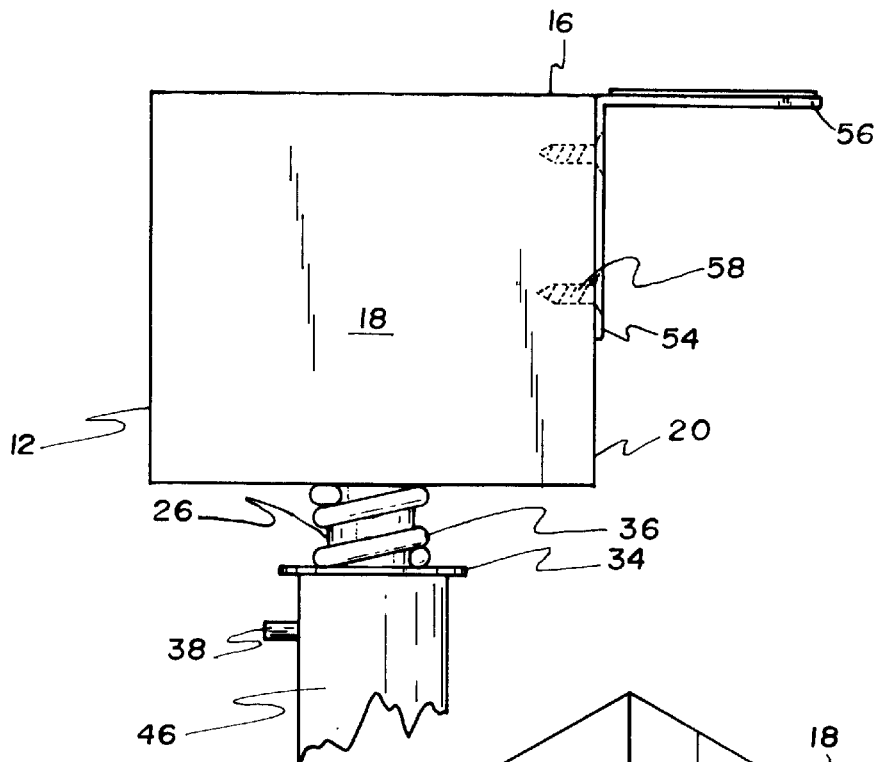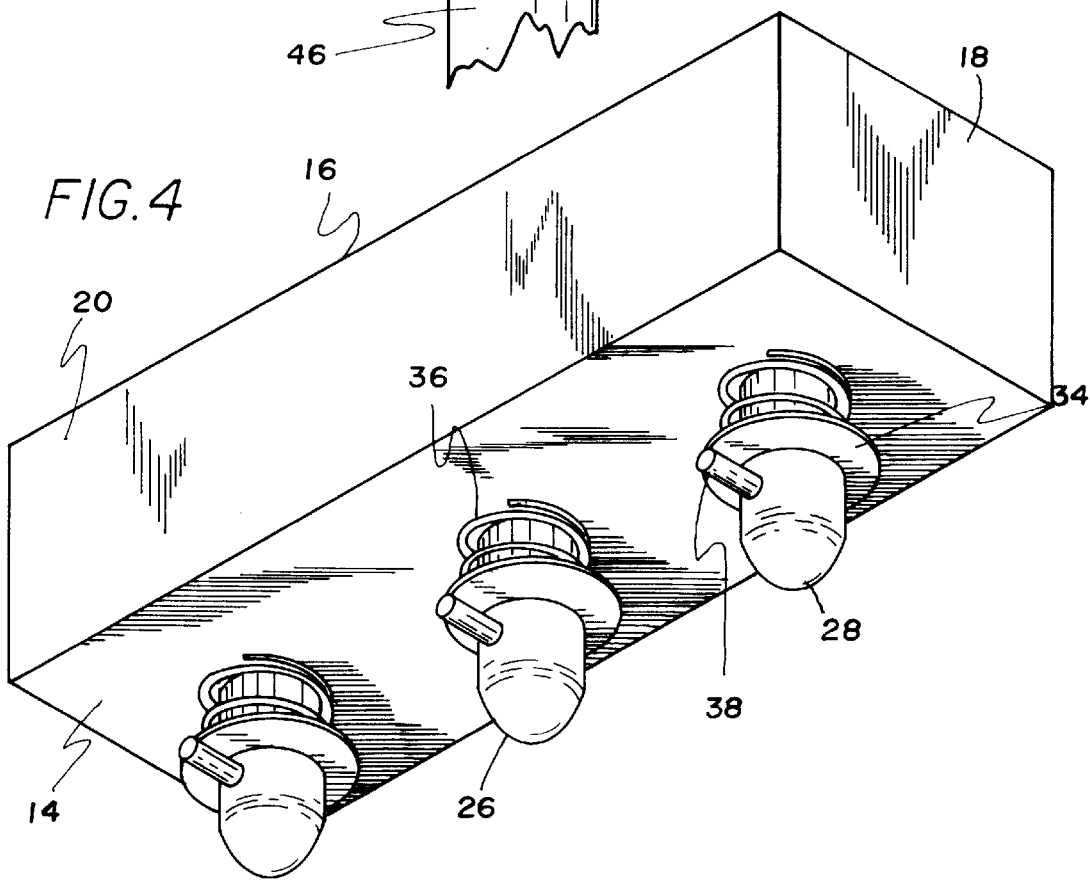

HOLDER FOR MIXER ATTACHMENTS

BACKGROUND OF THE INVENTION

1. Field of the Invention

The present invention relates to a Holder for mixer attachments and more particularly pertains to providing a kitchen aid for storage of mixer attachments, in a vertical orientation, onto a mounted base member.

2. Description of the Prior Art

The use of a kitchen utensil holder is known in the prior art. More specifically, kitchen utensil holders heretofore devised and utilized for the purpose of storing kitchen utensils are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,183,439 to Bell discloses a utensil and tool holder. U.S. Pat. No. 4,254,881 to Hard discloses an overhead kitchen utensil rack. U.S. Pat. Des. 285,647 to Sachs discloses a drop clamp suspension bracket or similar article. U.S. Pat. No. 4,753,406 to Kodama and Takami discloses a hanger for kitchen appliances. U.S. Pat. No. 4,852,930 to Agee discloses a utility decorator. Lastly, U.S. Pat. No. 4,728,158 to D'Elia and DeVries discloses a Modular rack storage system and its method of assembly.

While these devices fulfill their respective, particular objectives and requirements, the aforementioned patents do not describe holder for mixer attachments that allows coated mixing attachments to be protected from marring or scratches, that occur when stored in a drawer, by storing them separately on a base member.

In this respect, the Holder for mixer attachments according to the present invention substantially departs from the conventional concepts and designs of the prior art, and in doing so provides an apparatus primarily developed for the purpose of providing a kitchen aid for storage of mixer attachments, in a vertical orientation, onto a mounted base member.

Therefore, it can be appreciated that there exists a continuing need for a new and improved holder for mixer attachments which can be used for providing a kitchen aid for storage of mixer attachments, in a vertical orientation, onto a mounted base member. In this regard, the present invention substantially fulfills this need.

SUMMARY OF THE INVENTION

In view of the foregoing disadvantages inherent in the known types of kitchen utensil holders now present in the prior art, the present invention provides an improved holder for mixer attachments. As such, the general purpose of the present invention, which will be described subsequently in greater detail, is to provide a new and improved holder for mixer attachments and method which has all the advantages of the prior art and none of the disadvantages.

To attain this, the present invention essentially comprises a generally rectangular base member that has a uniform structure. The base member has a front wall, a back wall and pair of short peripheral walls and a pair of long peripheral wall between the front and back wall. A plurality of guide dowels are included. Each guide dowel is tapered at one end and interconnected to the front wall of the base member at another end. Each guide dowel has a washer and spring positioned therearound. Each guide dowel has a retaining pin threadedly positioned within a side. Each retaining pin is capable of allowing each washer of each guide dowel to apply limited compression force against the spring. Included is at least one electric mixer attachment. The mixer attachment is positionable over one of the guide dowels. The mixer attachment has a neck portion with a key hole that is capable of engaging the retaining pin of the dowel, when the neck portion applies pressure against the washer. The neck of the mixer attachment is twisted for locking the mixer attachment onto one of the guide dowels. Lastly, an L-shaped bracket is provided. The bracket has a first panel and a second panel. The first panel is fixedly attached to one of the long side walls of the base member. The second panel is projected outwardly from the base member when the first panel is attached to the base member. The second panel has a mounting surface and a plurality of holes. The mounting surface has a strip of adhesive material attached. The second panel is capable of coupling with a receiving structure for securing the base member, with the mixing attachment coupled and juxtapose the receiving structure. The adhesive material is capable of securing the second panel to the receiving structure.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved holder for mixer attachments which has all of the advantages of the prior art kitchen utensil holders and none of the disadvantages.

It is another object of the present invention to provide a new and improved holder for mixer attachments which may be easily and efficiently manufactured and marketed.

It is further object of the present invention to provide a new and improved holder for mixer attachments which is of durable and reliable constructions.

An even further object of the present invention is to provide a new and improved holder for mixer attachments which is susceptible of a low cost of manufacture with regard to both materials and labor, and which accordingly is then susceptible of low prices of sale to the consuming public, thereby making such holder for mixer attachments economically available to the buying public.

Even still another object of the present invention is to provide a holder for mixer attachments for providing a kitchen aid for storage of mixer attachments, in a vertical orientation, onto a mounted base member.

Lastly, it is an object of the present invention to provide a new and improved holder for mixer attachments including a base member. The base member has a front wall, a back wall and pair of short peripheral walls and a pair of long peripheral wall between the front and back wall. A plurality of guide dowels are interconnected to the front wall of the base member. Each guide dowel has a retaining pin positioned within a side of the dowel.

At least one electric mixer attachment is positioned over one of the guide dowels. The mixer attachment has a neck portion with a key hole that is capable of engaging the retaining pin of the dowel. Lastly, an L-shaped bracket is provided. The bracket has a first panel that is fixedly attached to one of the long side walls of the base member. The bracket has a second panel that is capable of coupling with a receiving structure for securing the base member juxtapose the receiving structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the base and bracket of the present invention.

FIG. 4 is an isometric view of the present invention of FIG. 1.

The same reference numerals refer to the same parts through the various Figures.

DESCRIPTION OF THE PREFERRED EMBODIMENT

Figure 1:
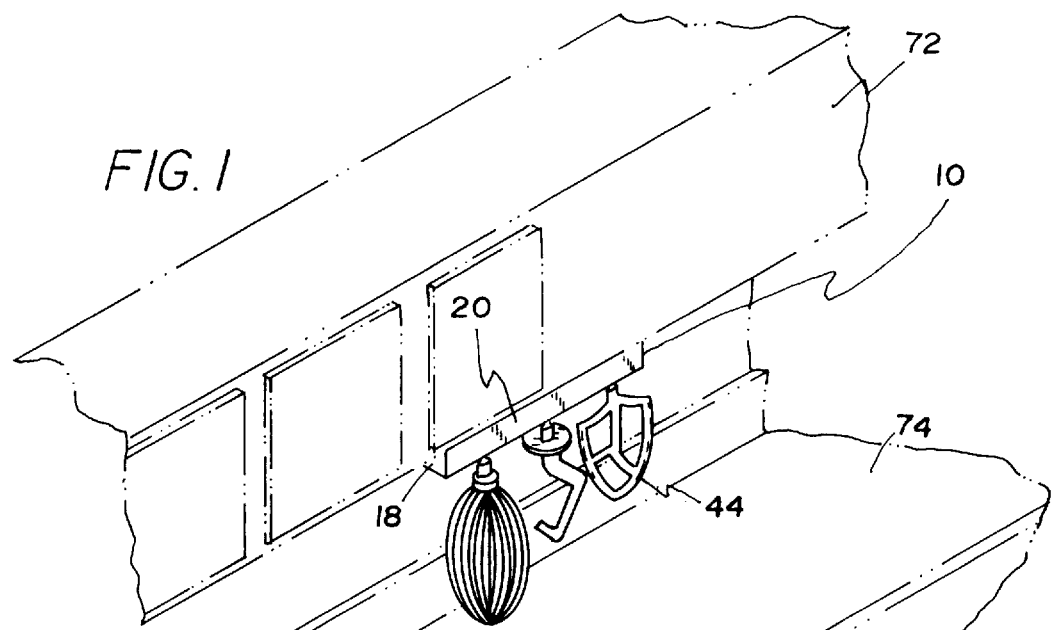
FIG. 1 is a perspective view of the preferred embodiment of the holder for mixer attachments constructed in accordance with the principles of the present invention.

With reference now to the drawings, and in particular to FIG. 1 thereof, the preferred embodiment of the new and improved holder for mixer attachments embodying the principles and concepts of the present invention and generally designated by the reference numeral 10 will be described.

The present invention, the holder for mixer attachments 10 is comprised of a plurality of components. Such components in their broadest context include a base, dowels and a bracket. Such components are individually configured and correlated with respect to each other so as to attain the desired objective.

Specifically, the present invention includes a generally rectangular base member 12. The base member has a uniform structure as seen in FIG. 4. The base member has a front wall 14, a back wall 16 and pair of short peripheral walls 18 and a pair of long peripheral walls 20 between the front and back wall. The front wall, back wall and each long peripheral wall have a length of 14.5 inches and a width of 1.5 inches. The height of the base member is 1 inch. The base member may be formed from metal, wood or plastic. In the present invention plastic is the material of choice because of its weight and durability.

Included are a plurality of guide dowels 26. As shown in FIG. 4, each guide dowel is tapered at one end 28 and interconnected to the front wall 14 of the base member at another end 30. The plurality of guide dowels are proportionately spaced in a symmetrical alignment along the base member. The spacing gap between any two of the plurality of guide dowels must be between about 2.5 to 4.5 inches. The spacing gap between the guide dowels is dependent upon the size of the guide dowel.

Also, a washer 34 and spring 36 are positioned over each guide dowel. The washer is a flat disc shaped washer and the spring is a coil spring. Each guide dowel having a retaining pin 38 threadedly positioned within a side 40 of the dowel. Each retaining pin, when placed within the respective dowel, is capable of allowing each washer of each guide dowel to apply limited compression force against the spring. FIG. 4 shows compression of the spring by the washer when the pin is in position.

Additionally, at least one electric mixer attachment 44 is positionable over one of the guide dowels 26. The mixer attachment may be a flat beater, a dough hook or a whip. The mixer attachment has a neck portion 46 with a key hole 48. The neck portion slides over any one of the guide dowels and the key hole engages the retaining pin of the dowel.

Figure 2:
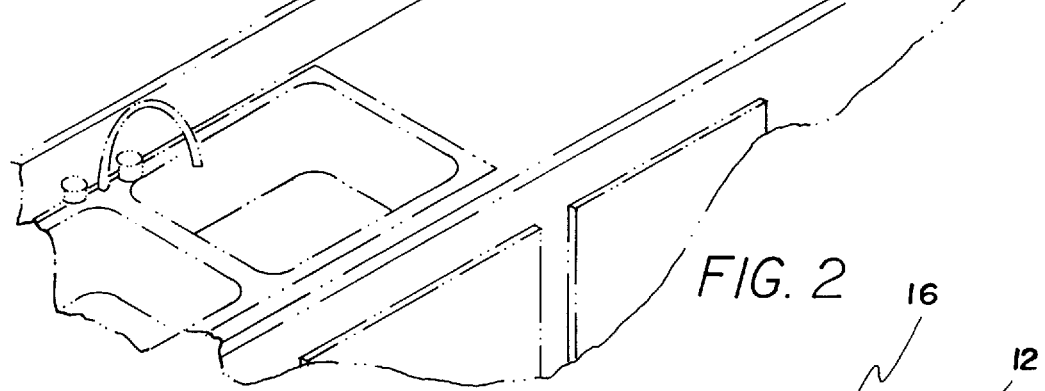
FIG. 2 is a frontal view of the present invention in an operable orientation.
Figure 5:
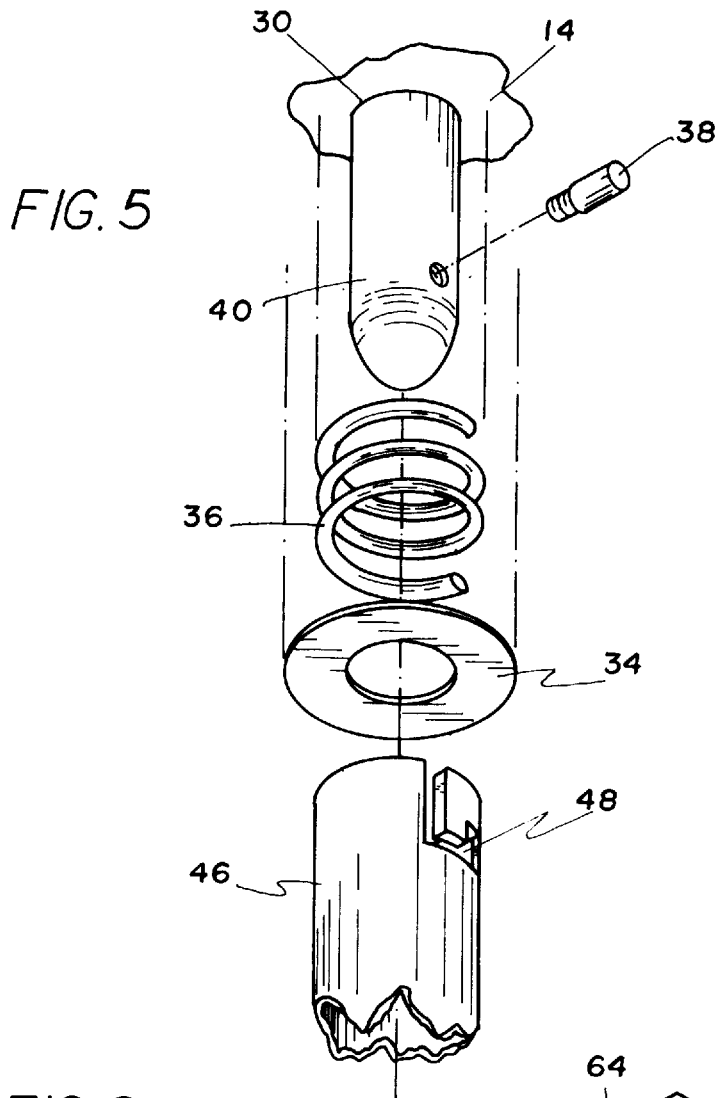
FIG. 5 is an exploded view of the dowel with operable components.

The neck portion 46 is required to apply pressure against the washer 34 in order for the key hole to engage the retaining pin. In operation, the neck of the mixer attachment is slid onto the guide dowel with the key hole receiving the retaining pin. Once the retaining pin 38 is in the key hole 48, the mixing attachment is twisted to lock the mixer attachment onto one of the guide dowels, as seen in FIG. 2. The present invention is structured to support at least three different or same type of mixer attachments.

Figure 6:
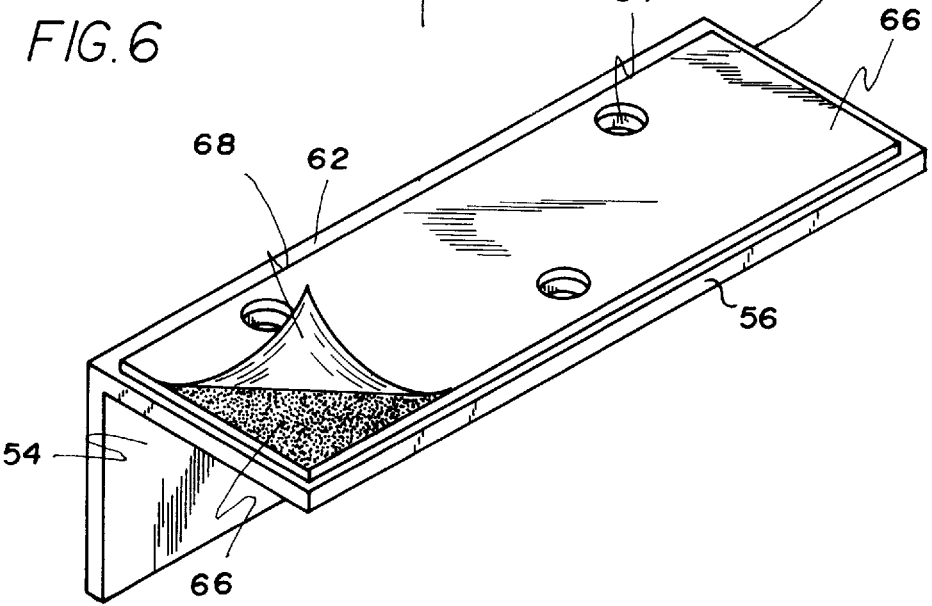
FIG. 6 an isometric view of the bracket and the adhesive backing.

Lastly, as shown in FIG. 6, an L-shaped bracket 52 is provided. The L-shaped bracket has a first panel 54 and a second panel 56. The L-shaped bracket is a mounting bracket made of metal or a metal alloy. The first panel is fixedly attached to one of the long side walls 20 of the base member, as depicted in FIG. 3. The first panel is attached by a plurality of screws 58. The second panel is projected outwardly from the base member when the first panel is attached to the base member. The second panel having a mounting surface 62 and a plurality of holes 64 through the mounting surface. The mounting surface and the back wall form a flush surface when the bracket is attached to the base member. The mounting surface has a strip of adhesive material 66 attached. The adhesive material has a film 68 that is protects the adhesive material prior to use of the bracket.

Furthermore, the second panel is capable of couplings with a receiving structure 72 for securing the base member to the structure. As shown in FIG. 1, the receiving structure is a kitchen cabinet. The base member, with the mixing attachments, are coupled to and juxtapose the receiving structure. It is to be understood that the receiving structure could be the counter top 74 or the side of the cabinet. When the L-shaped bracket is attached to the receiving structure, the film is removed from the adhesive material and the adhesive material is capable of securing the second panel to the receiving structure. To strength the coupling of the L-shaped bracket and the receiving structure, screws may be positioned through the holes of the second panel and the receiving structure.

The present invention holder for mixer attachments is designed to provide storage for a kitchen mixer's. The holder will keep the tools' non-stick coating from being damaged. The holder can be mounted beneath kitchen cabinets or it can be stood on counter tops. The L-shaped mounting bracket will allow the base member to be secured with screws or an adhesive.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved holder for mixer attachments for supporting an attachment in a vertical orientation comprising in combination:

a generally rectangular base member having a uniform structure, the base member having a front wall, a back wall and pair of short peripheral walls and a pair of long peripheral walls between the front and back wall;

a plurality of guide dowels with each being tapered at one end and interconnected to the front wall of the base member at another end, the plurality of guide dowels being proportionately spaced between about 2.5 to 4.5 inches one from the other in a symmetrical alignment along the base member, each guide dowel having a washer and spring therearound, each guide dowel having a retaining pin threadedly positioned within a side thereof, each retaining pin being capable of allowing each washer of each guide dowel to apply limited compression force against the spring;

at least one electric mixer attachment being positionable over one of the guide dowels, the mixer attachment having a neck portion with a key hole being capable of engaging the retaining pin of the dowel when the neck portion applies pressure against the washer, the neck of the mixer attachment being twisted for locking the mixer attachment onto one of the guide dowels; and an L-shaped bracket having a first panel and a second panel, the first panel being fixedly attached to one of the long side walls of the base member, the second panel being projected outwardly from the base member when the first panel being attached to the base member, the second panel having a mounting surface and a plurality of holes therethrough, the mounting surface having a strip of adhesive material attached thereto, the second panel being capable of coupling with a receiving structure for securing the base member, with the mixing attachment coupled thereto, juxtapose the receiving structure, the adhesive material being capable of securing the second panel to the receiving structure, the L-shaped mounting bracket being secured to the receiving structure and the base member in alternative directions for allowing the plurality of guide dowels to be upwardly extended and downwardly extended.

\* \* \* \* \*